(12) United States Patent
Chan et al.

(10) Patent No.: US 7,613,637 B2
(45) Date of Patent: Nov. 3, 2009

(54) PARTICIPANT NODE FOR A SEARCHABLE DISTRIBUTED INFORMATION NETWORK

(75) Inventors: Bill Chan, Los Altos, CA (US); Chong Yea Shaw, Fremont, CA (US)

(73) Assignee: BCKS, Sunnyvale, CA (US)

( * ) Notice: Subject to any disclaimer, the term of this patent is extended or adjusted under 35 U.S.C. 154(b) by 3 days.

(21) Appl. No.: 10/905,162

(22) Filed: Dec. 19, 2004

(65) Prior Publication Data

US 2006/0167769 A1 Jul. 27, 2006

(51) Int. Cl.
*G06F 17/30* (2006.01)
(52) U.S. Cl. ........................................ 705/27
(58) Field of Classification Search ............... 705/26, 705/27
See application file for complete search history.

(56) References Cited

U.S. PATENT DOCUMENTS

| 4,477,881 | A | | 10/1984 | Kobayashi | |
|---|---|---|---|---|---|
| 5,897,622 | A | * | 4/1999 | Blinn et al. | 705/26 |
| 7,581,218 | B2 | * | 8/2009 | Johnson | 717/172 |
| 2001/0001147 | A1 | * | 5/2001 | Hutchison et al. | 705/26 |
| 2001/0011239 | A1 | * | 8/2001 | Kondoh et al. | 705/27 |
| 2002/0091582 | A1 | * | 7/2002 | Palmer et al. | 705/26 |
| 2005/0257079 | A1 | * | 11/2005 | Arcangeli | 714/4 |
| 2006/0085287 | A1 | * | 4/2006 | Hutchison et al. | 705/26 |

OTHER PUBLICATIONS

Jasco, Peter. "Shopbots: Shopping robots for electronic commerce." Onlineinc.com/onlinemag. Jul./Aug. 1998; p. 14.*
"Price Watch, www.pricewatch.com." Electronic Buyers' News. Manhasset: Jan. 25, 1999, Iss 1144; p. 48.*
Taylor Dennis. "U. Vision becomes online broker for hardware purchases." The Business Journal. May 26, 1997; p. 5.*

* cited by examiner

*Primary Examiner*—Susanna M Diaz (57) ABSTRACT

Described herein is a system for a computer based market for goods, services, or information and any combination thereof with its foundation a multitude of user owned computers and a network of server computers which creates a relationship between the user of the consumer owned computers and the owners or operators of a network of server computers by the users use of application software to provide information regarding goods, services, or information and any combination thereof that the user wishes to market. The software's purpose is to make the user's computer perform as a server computer so that information regarding goods, services, or information and any combination thereof can be made available in the market created by a token description of the good, service, or information and any combination thereof on the network of server computers.

27 Claims, 9 Drawing Sheets

PARTICIPANT NODE FOR A SEARCHABLE DISTRIBUTED INFORMATION NETWORK

BACKGROUND OF THE INVENTION

There currently exists numerous avenues to sell goods, services, and information including newspaper classified advertising, brick and mortar retail and wholesale outlets, and auctions. There exists the electronic equivalent of these avenues in the form of electronic bulletin boards, URL's for the World Wide Web to establish an electronic storefront, and electronic auctions sites such as eBay.

Prior art does not allow the participant node to share online information about the goods, services, and information available in their computer; instead the information is transferred to other computers in the network; these server computers are generally but not always operated by the market creator organizations. Present art does not provide a means for a participant node user to create a source of goods, services, and information in their own computer that other users of the network may search and examine.

DESCRIPTION OF THE INVENTION

The present invention seeks to fulfill the following objectives to fill the gap in present art by providing a computer means to (1) create information online and retain information about goods, services, and information in participant node computers; this information to be made viewable and searchable by users in the network when said computer is connected to the network either physically as in a wired connection or through any means not requiring physical attachment such as wireless standard 802.11b, (2) allow participant node users to change, edit, delete information, about said goods, services, and information in the participant node and market creator network, (3) view and search the goods, services, and information available in participant nodes, (4) place a token description of the participant nodes available goods, services, and information in the database of a market creator network connected to an electronic network such as the Internet, this database to be made searchable by users in the network, (5) remove expired ads, for example, by automatically removing token descriptions of goods, services, or information from the database of said market creator network after a selected period of time, (6) send electronic mail to each other with the responses sorted by categories such as the goods, services, and information being made available for sale, and (7) provide an electronic message management system to participant node users to make inquiries, determine shipping method, negotiate price, determine method of payment, and other matters appurtenant to a sale or trade for the said goods, services, and information.

The present invention is a large network of participant nodes with hardware and software enabling the participant node to communicate with a market creator network embedded in a wide area network such as the Internet. A simple participant node may consist of a computer, digital camera, digital scanner, a display, a printer, a keyboard, and a network connection. Said participant node may use a multitasking operating system such as Linux, Windows 98, NT, XP or Apple OSX and support a number of protocols simultaneously. Examples are Transport protocol (OSI model layer 4) such as UDP, TCP; Network protocol (OSI model layer 3) such as IP; WAN protocols such as ATM; Broadband Access such as ISDN, DSL and Cable, Frame Relay, PPP, X.25, SDLC.

Participant nodes are users enabled with software to be able to communicate with said market creator network as described below. Said software may be designed to work with products such as IBM type personal computers, Apple type personal computers, professional workstations such as made by Sun and HP, personal digital assistants such as made by Palm, video game hardware such as made by Nintendo, and similar products. The market creator network or third party software vendors such as Microsoft may supply said software. For the purposes of this application, the term "participant node application software" will refer to this software that may also call other application programs to enable the user to become a participant node.

The following is a general description of what the participant node application software could be expected to accomplish. When the participant node user starts the participant node application software, said software checks if the participant node has a "node identification code" assigned to the participant node by the market creator network. If no node identification code is found, said application software sends a request to the market creator network for a new node identification code to be assigned. The operator of said market creator network will supply the participant node with a node identification code to allow the participant node access to the market creator network.

The market creator network saves and updates the network address, such as an IP address, of the participant node that is making the request to the market creator network. The participant node application software monitors the network address of the participant node. If a change in the participant node's network address occurs, said application software notifies the market creator network of the change. The market creator network then updates and saves the participant node's new address to its database.

After a user has installed said software and received the node identification code from the market creator network, the user has become a "participant node" user and as such, part of a quality controlled network; this quality assurance provided by said market creator network operator or owner. The participant node user can send token descriptions of any good, service, and information available for sale or distribution to the market creator network database.

The participant node application software will allow the participant node user to add, edit or delete token descriptions that originate from said participant node in the market creator network database. One method of accomplishing this is as follows. The participant node application software requests a form, such as a database form, for the data file from the market creator network. The user fills in the form with information including the token description to be uploaded to the market creator network database, an electronic mail address, a price, additional, text description to remain stored in the participant node, and photographs and artwork to remain stored in the participant node. Said form that includes the token description is uploaded to the market creator network with the participant node id attached. The owner or operator of the market creator network verifies that enough information has been filled out in the form and places the data in the market creator network database if the information is deemed sufficient.

The market creator network allows users of a wide area, electronic network to which said market creator network is connected, such as the Internet, to search for goods, services, and information that have token descriptions provided by participant node users. Those who use the Internet to search the market creator network database do not need a node identification code or have any affiliation with the market creator network such as being a registered user.

The market creator network will have a search engine as part of its makeup. The following is a description of one possible implementation of the search mechanism in the market creator network. Said search mechanism can yield results of a search in the form of a list of the token descriptions provided by the multitude of participant nodes. The token descriptions will have a link such as a web URL to the participant node computers. This link is created when the search results are presented to the user. The market creator network can link the current network address of the participant node directly or indirectly, such as through a relay server in the market creator network, to the token description provided by said participant node. The user can follow the link in the token description back to a full description of the goods, services, and information located in said participant node computer when said participant node is online. Users can communicate directly with the participant node user via electronic mail or by sending queries to the electronic mailbox provided said participant node user by the market creator network. The full description of the good, service, and information located in the participant node can contain textual information, photographs of goods, and files that are available. Said full description is created via the participant node application software. The participant node user sets the terms of the sale. Said participant node user can set terms such as sell at a fixed price, a fixed price or best offer, ask for bids, include shipping, charge for shipping and handling, and collect sales tax amongst others.

The present invention allows a user to find and purchase goods, services, and information from a participant node user by searching the market creator network for token descriptions of said goods, services, and information. A user may enter the market creator network that is connected to the Internet via an Internet service provider and a personal computer or any of a vast array of other electronic means such as a personal digital assistant. The link to the further description of said goods, services, and information located in the participant node is available in the token description, if any, which appears as a result of said user search. The user may use an electronic mail address or a telephone number listed in the token description or the electronic message management available on the market creator network to communicate with said participant node user.

The market creator network operator or owner establishes their business by creating a database of goods, services, and information. Participant node users fill the market creator network database using the participant node application program to create and send the necessary data files. The participant node user is the legal and equitable owner of the good, service, and information presented for sale or trade. The market creator network does not represent either party to a sale or trade other than to provide the means by which users and participant node users meet and to facilitate communications between them for said sale or trade.

Said market creator network may supply the participant node user with one or more private electronic mailboxes as part of said market creator's assured network. The participant node user may use said electronic mailbox to sort, receive, respond, or originate queries to and from other participant nodes and other users.

The market creator network may establish and enforce quality control standards. The market creator network assures a better experience for all users by means of these standards.

FIGURES

For the purposes of this application and the figures described below, the wide area, electronic network to which the market creator network, users, and participant nodes are connected will be described as the Internet although the invention may be implemented on any wide area, electronic network.

Figure 1:
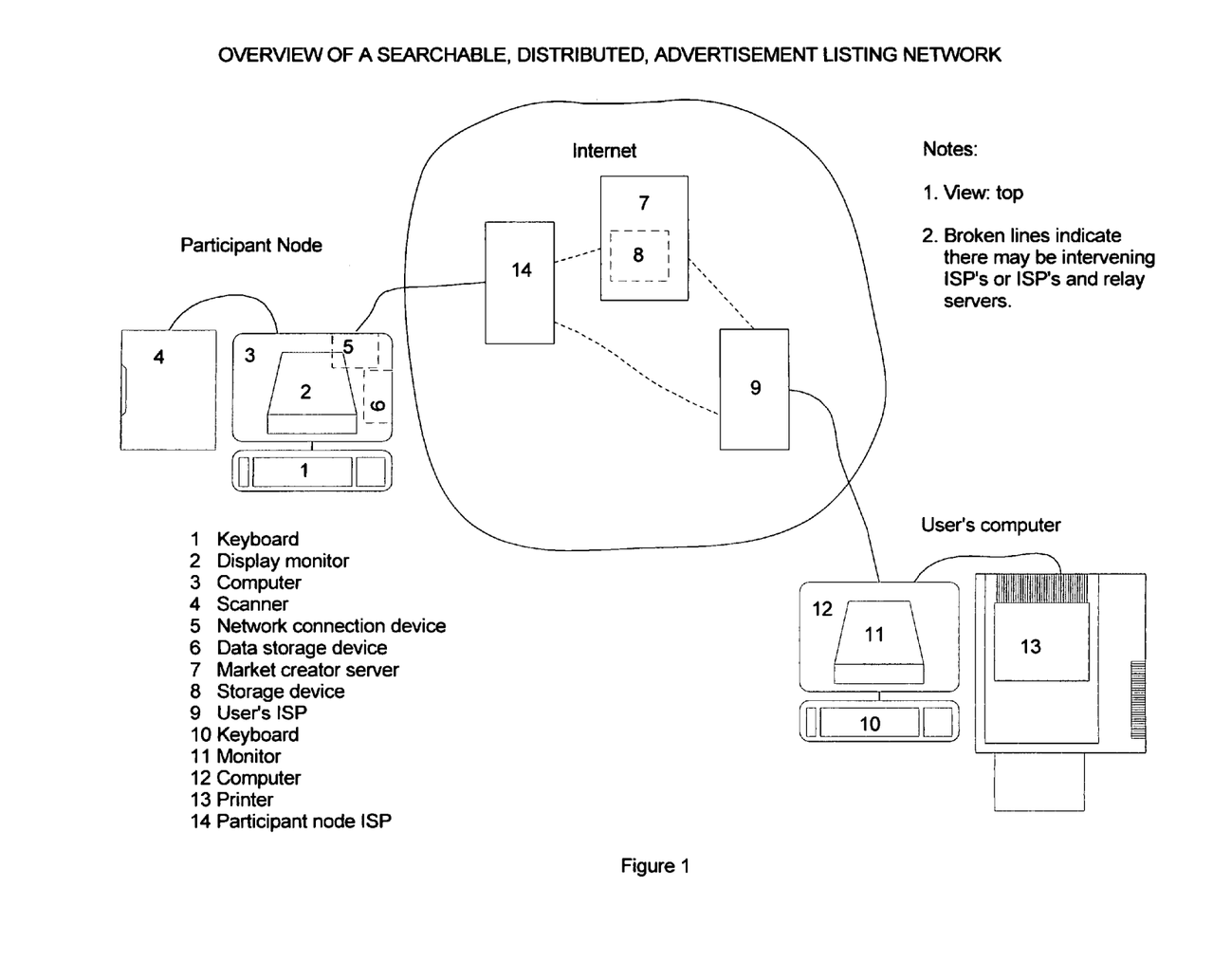
FIG. 1 shows an overview of a searchable, distributed, advertisement, listing network consisting of a participant node and user computer both shown connected via the Internet to their respective Internet service providers. These ISP's are connected to the market creator server with its searchable database. It shows how the participant node, composed of keyboard 1, display 2, computer 3, scanner 4, communication interface 5, and storage device 6, and a user computer, consisting of a keyboard 10, display 11, computer 12, and printer 13 are connected to the Internet. The participant node is connected to Internet service provider (ISP) server 14. The user computer is connected to user ISP server 9. Servers 9 and 14 are connected again via the Internet, potentially through several layers of other servers and relay servers, to market creator server 7, which contains a storage device 8 for storing the market creator network database. Participant node users are distinguished from ordinary users by having installed the participant node application software and a participant node identification code obtained as described with FIG. 5.
Figure 2:
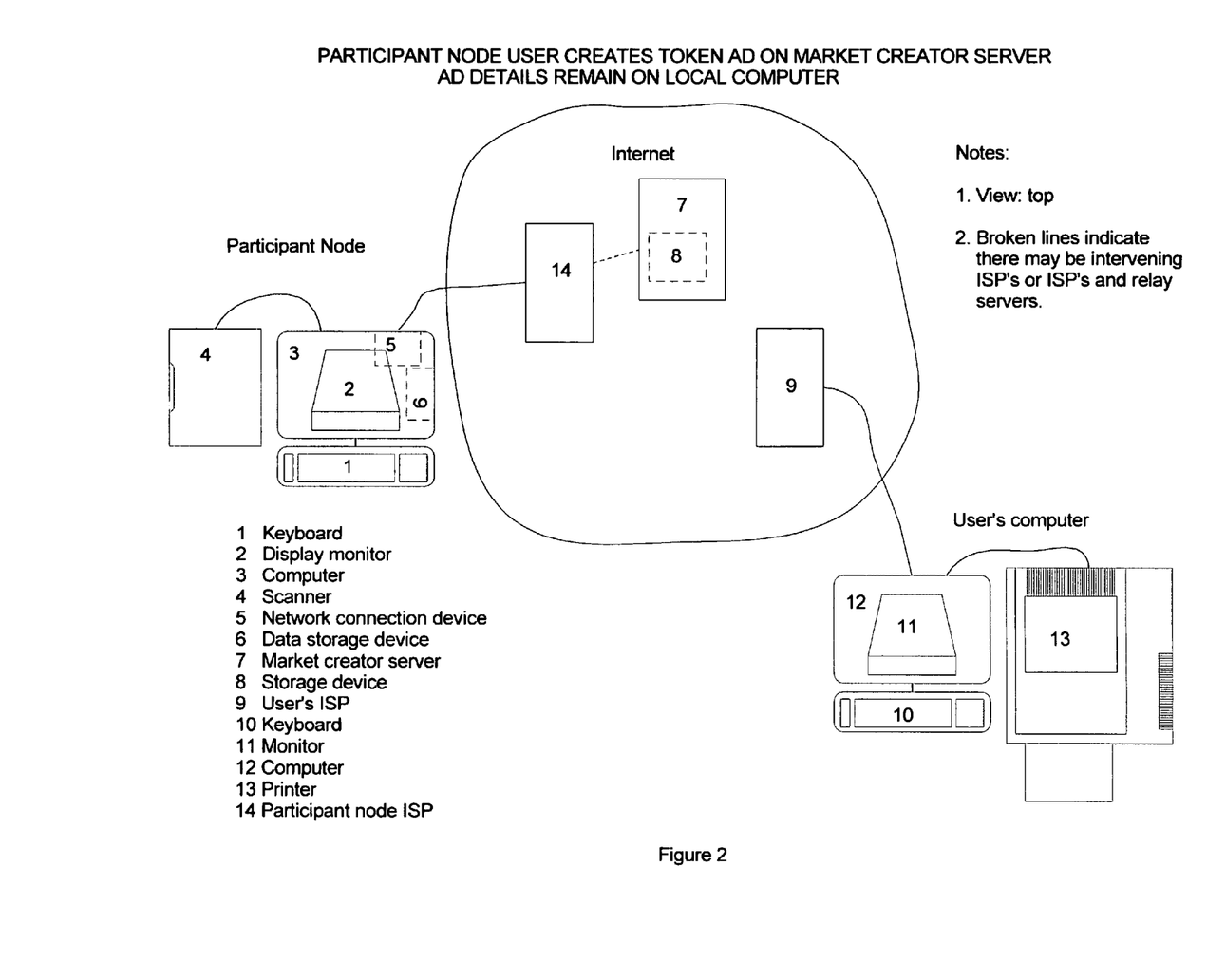
FIG. 2 shows the same advertising listing network in which the participant node is engaged in creating an advertisement for listing on the market creator network. The participant node user requests a form using the participant node application software. Server 7 sends this form to the participant node when the participant node initiates the process to create an ad. Said form appears on participant node display 2. Said form contains data fields for the participant node user to complete with information regarding the good, service, and information for sale or trade. Said participant node user creates images of the good, service, and information with scanner 4 or any of a vast array other means of creating digital images such as a digital camera. Said digital images are entered into a file via the participant node application software.
Figure 3:
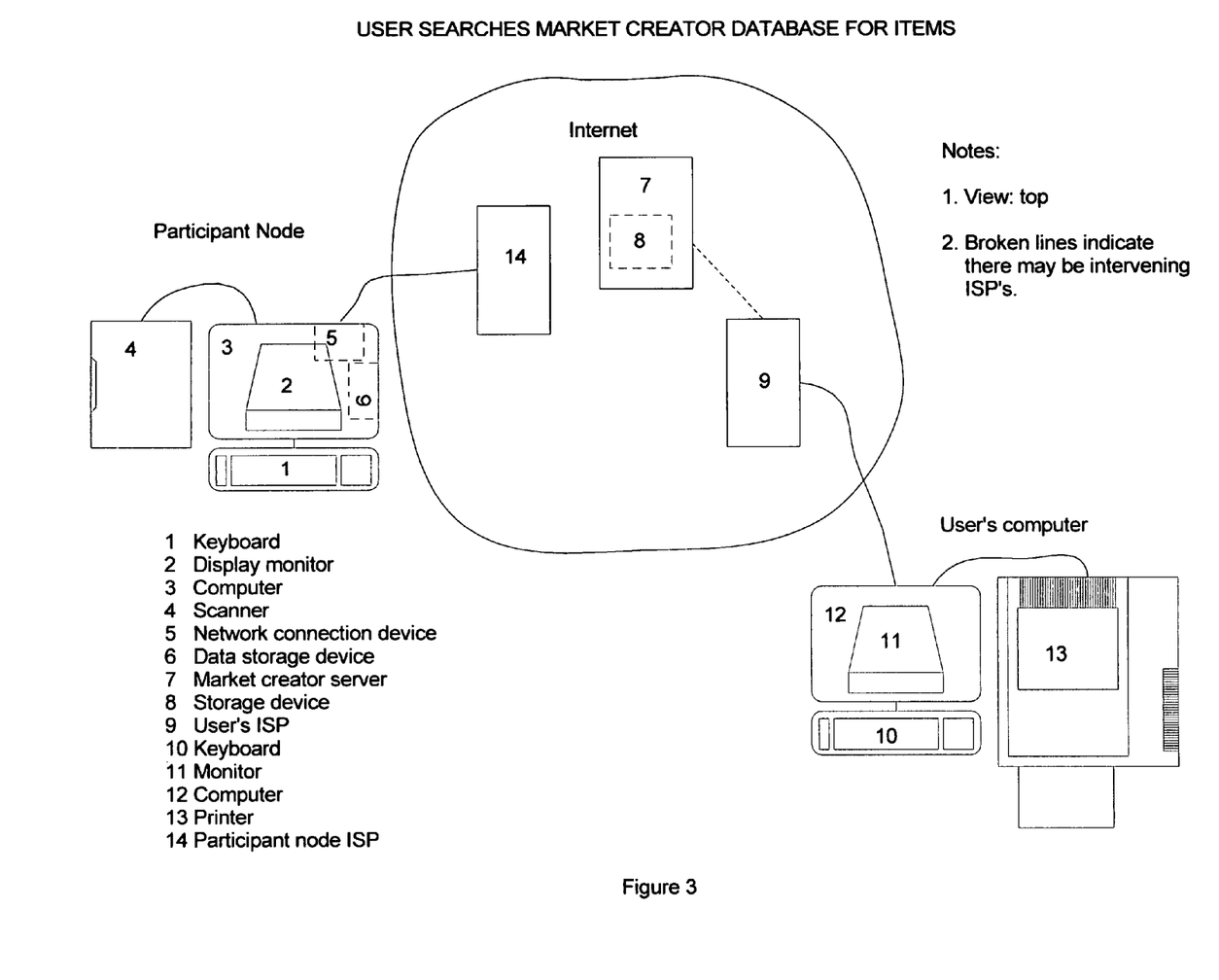
FIG. 3 shows the same advertising listing network in which the user computer is searching the market creator network for goods, services, and information. The user is connected to ISP server 9. The user using a web browser locates the market creator server 7 with its searchable database contained in storage device 8. The user searches database storage device 8 using keywords. Server 7 returns any search results to the user who can view these results on display 11. The search results, if any, displayed are the token descriptions provided by participant node users. These token descriptions contain a link embedded either directly with the network address of the participant node or indirectly with the network address of a relay server.
Figure 4:
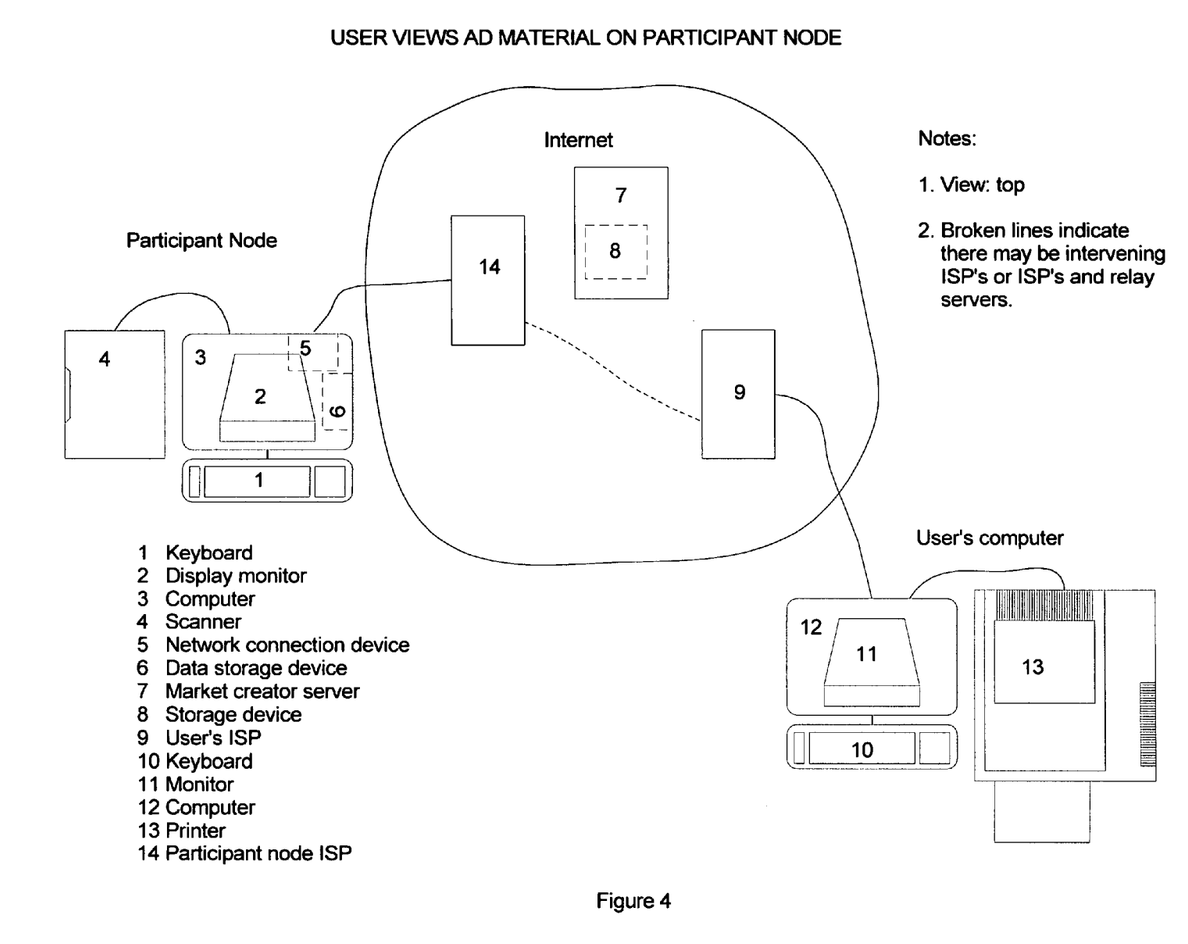
FIG. 4 shows the same advertising listing network in which the user computer is viewing advertising material residing in the participant node computer.

The participant node application software directly or indirectly, such as by calling another application program, verifies that the participant node user has included sufficient information for said form to be considered complete. Said form will be returned to the participant node user for completion if insufficient information has been entered. A data file is created and sent to the market creator network server 7 via the persistent network connection once said form is deemed completed. The market creator network does a second verification for quality control purposes. If the second verification is successful, the market creator operator or owner accepts the file and inserts the token description of the good, service, and information into the market creator network database. The market creator server returns the remainder of the file to the participant node to be stored in storage device 6 at a location determined by the participant node application software. Said software may then exit.

FIG. 4 shows that the user is connected to the participant node computer if the user clicks on said link in the token description. This connection can only be made if the participant node is connected to the Internet and online. The participant node application software makes the participant node computer behave like a server allowing the user to view the ad material that was created via said participant node application software and placed in storage device 6.

Figure 5A:
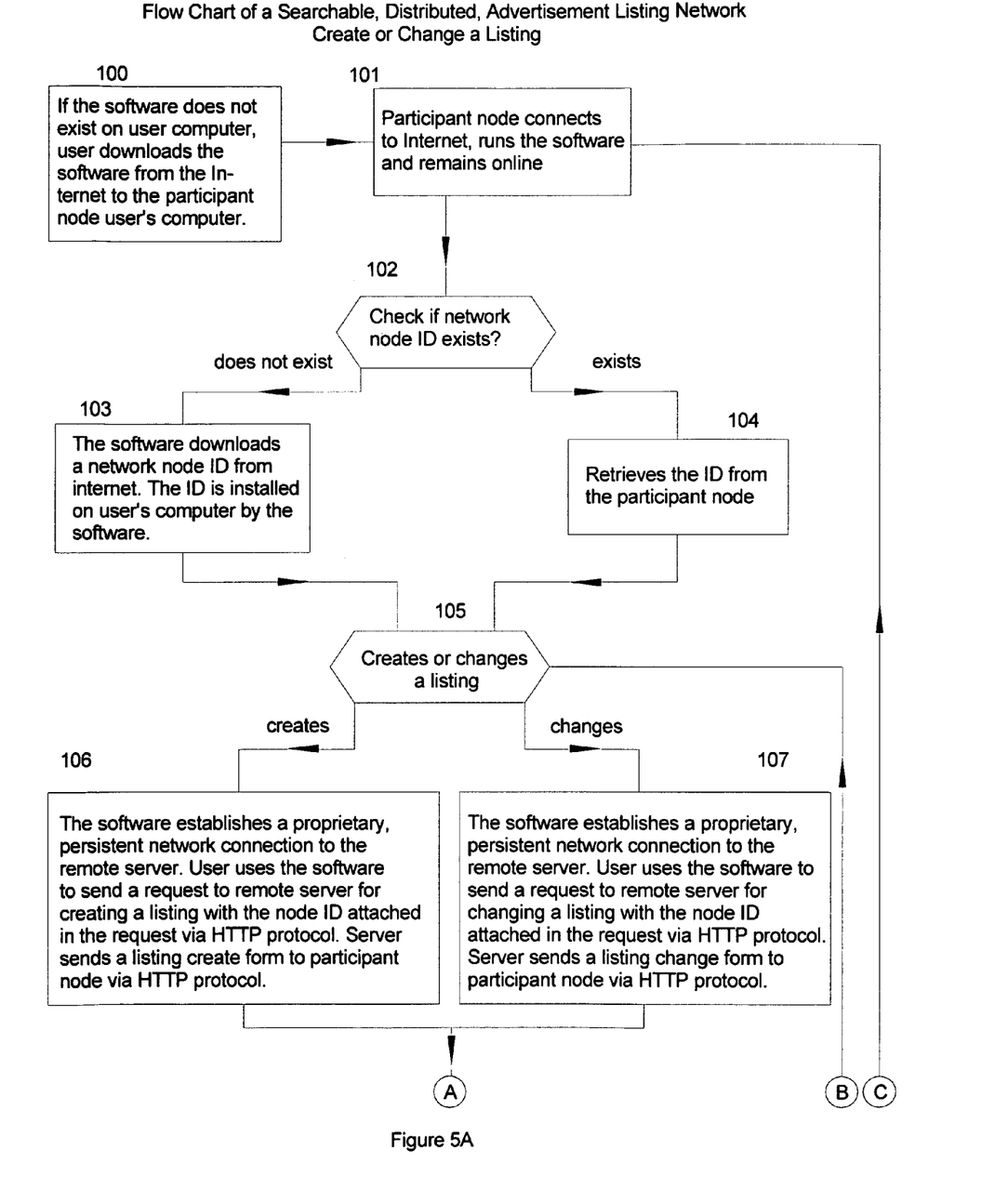
FIGS. 5A and 5B show a flow chart of how the participant node, market creator network, and the participant node application software work together. For the purposes of this example, it is assumed that the market creator network will provide the participant node application software to the user although this software may be available from other sources. At procedure 100, the user goes to the market creator network web site and using a web browser downloads the participant node application software from the market creator network via a global communication network such as the Internet to which both the participant node and market creator network are connected. The user runs the participant node application software at procedure 101. Procedure 102 checks if the participant node has an assigned node identification code. If the participant node does not have a node identification code, the participant application software downloads a network node identification code from the market creator network via the Internet at procedure 103. The network node identification code is installed in the participant node by said participant node application software. If the participant node does have a network node identification code, the market creator network server retrieves the code from the participant node computer at procedure 104.
Figure 5B:
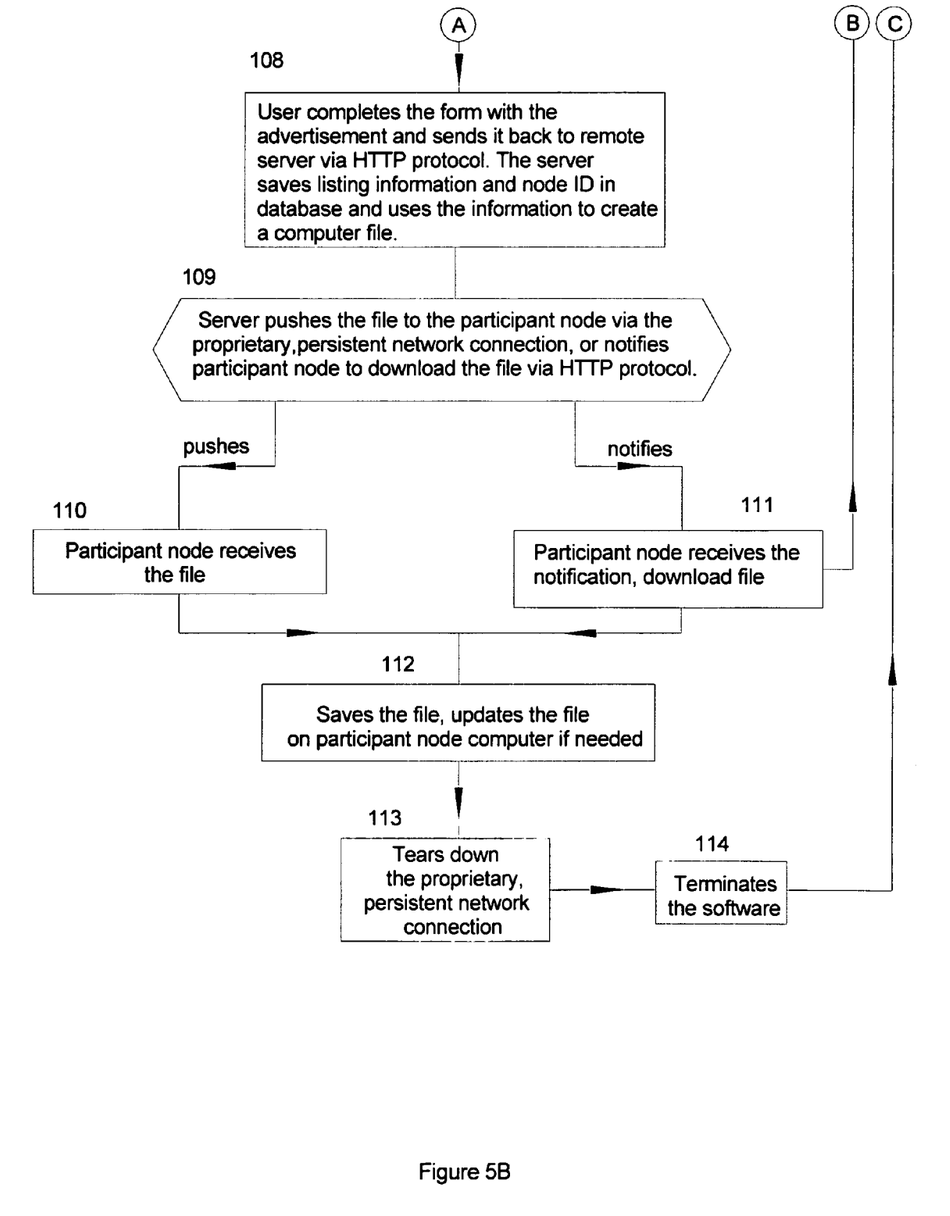
Figure 6A:
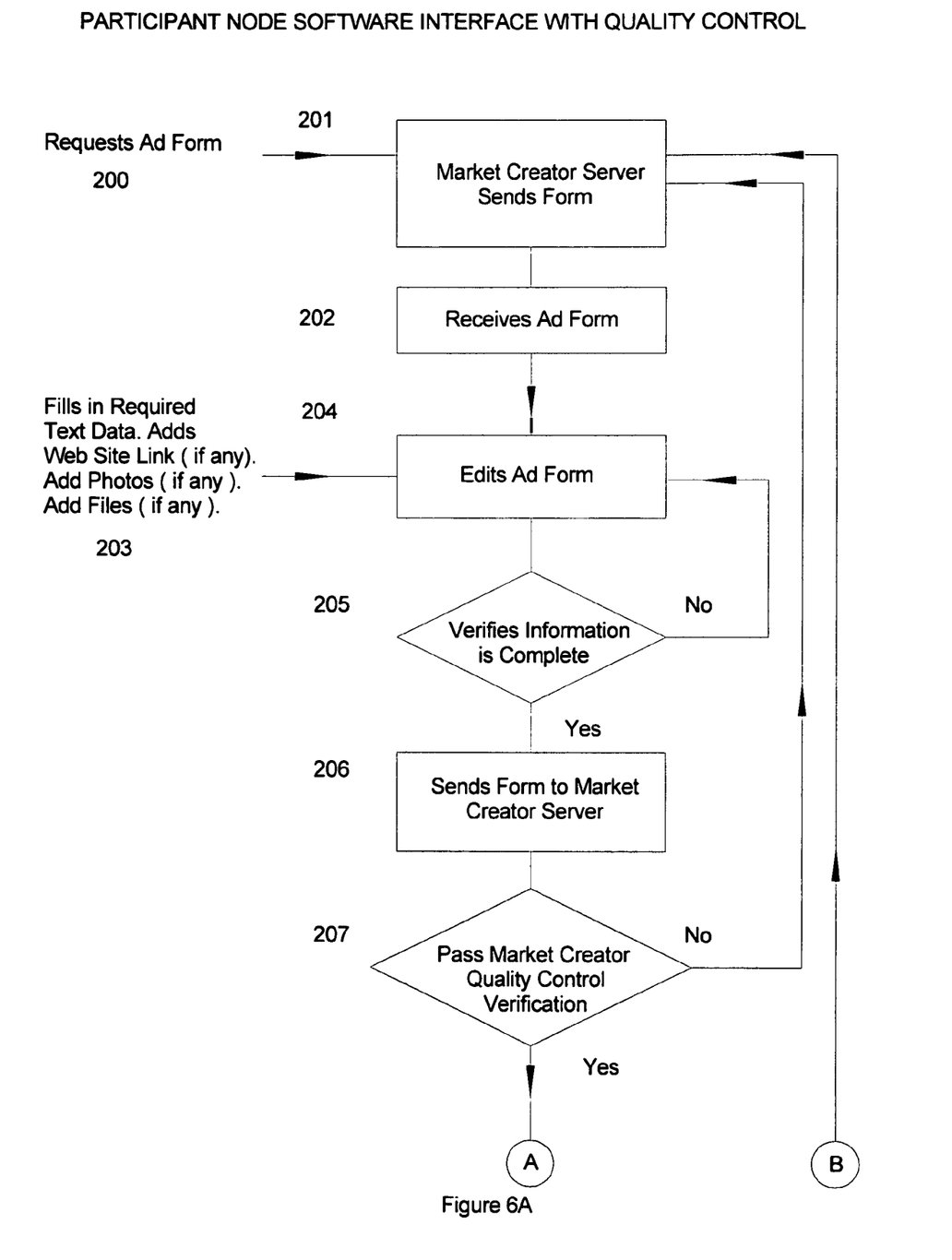
FIGS. 6A and 6B are a flow chart of an example of an implementation of the participant node software interface with quality control to the market creator network server. Procedure 200 is a request from the participant node to the market creator network server for a new advertisement form. The market creator network sends the requested form at procedure 201. The form is received at procedure 202. The participant node user fills in the necessary textual information, adds a web site link, if any, to the form, adds photographs or scanned images, if any, to the form, adds files, if any, to the form at procedure 204. The participant node application software directly or indirectly, such as by calling another application program, verifies that the required information on the form is complete at procedure 205. Said software sends said form back to participant node user to enter the missing information at procedure 205 if the information is not complete. If the information is complete, said software sends the form to the market creator network server where the operator of said network verifies the advertisement for quality control purposes at procedure 206. If the market creator network operator rejects the ad, it is returned to the participant node user for changes. If the ad is accepted, the market creator network operator creates a data file and places the token ad into the market creator network database at procedure 208. The file created by the market creator network is sent back to the participant node at procedure 209. At procedure 210 the participant node receives the file and at procedure 211 the participant node application software places the file into storage in the participant node. Procedure 212 gives the participant node user the opportunity to create another ad or exit at procedure 213.
Figure 6B:
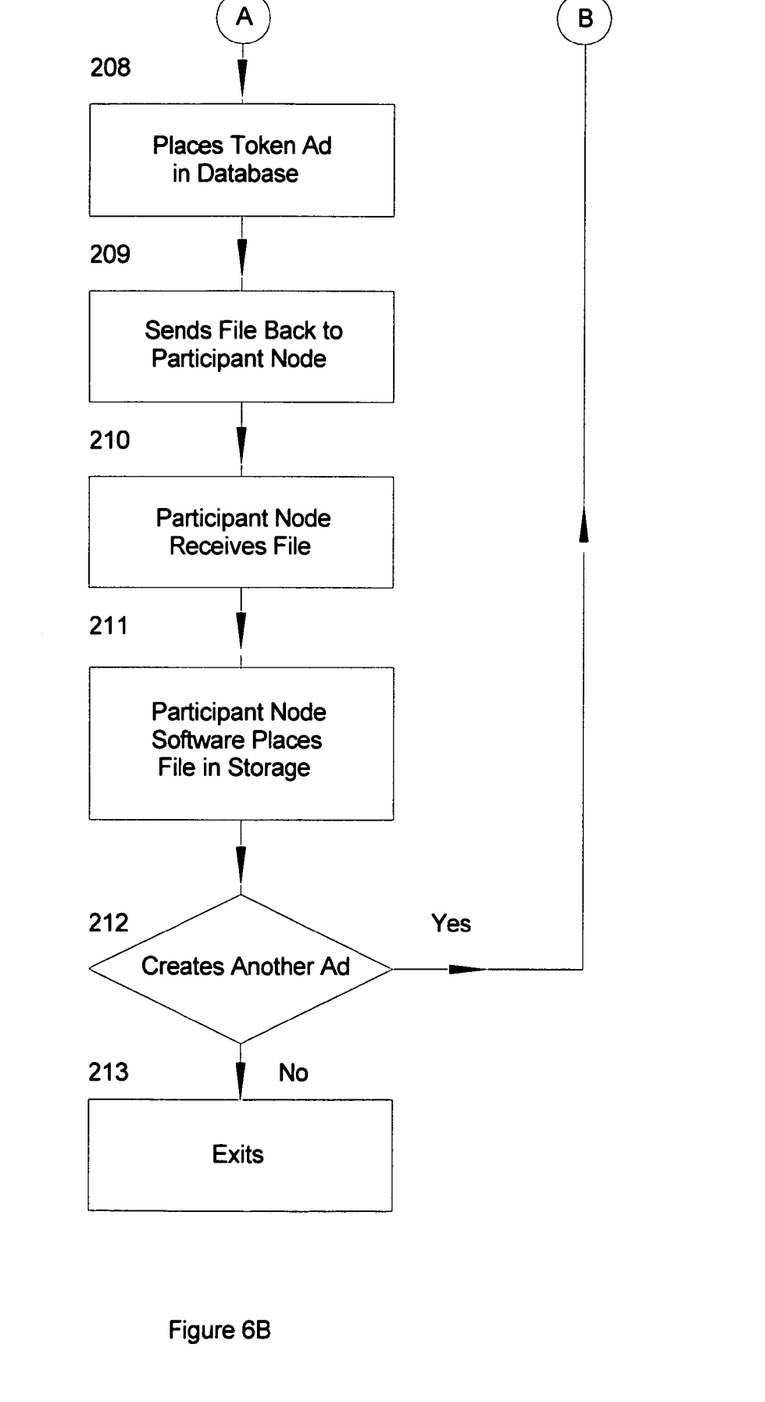
Figure 7:
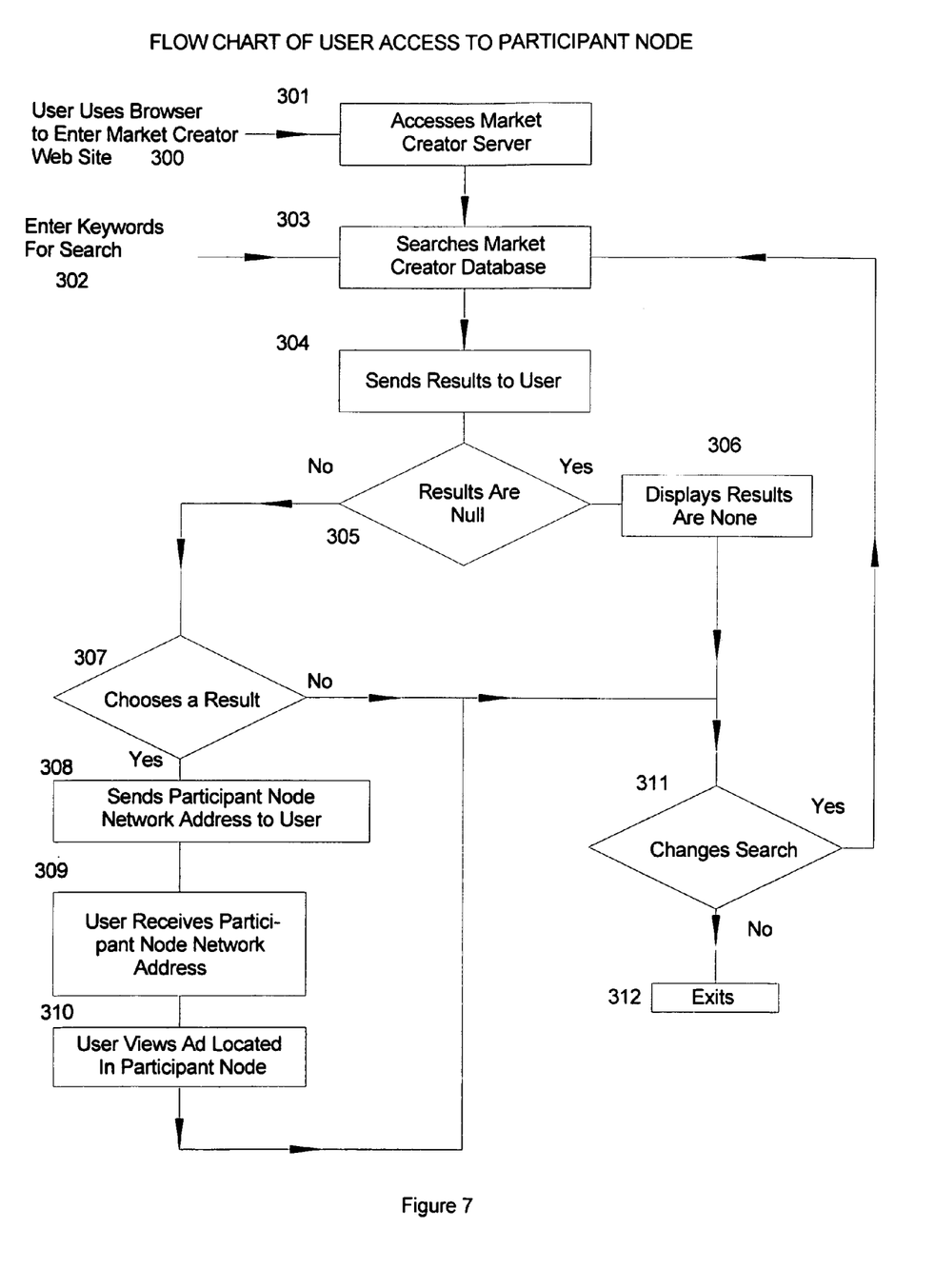

Procedure 105 allows the participant node user to select to create a new ad or change an existing ad. If the participant node user decides to create a new ad, procedure 106 has the participant node application software establish a persistent network connection to the market creator network server. The participant node user uses said software to send a request to the market creator network server for creating an ad with the participant node network identification code attached to the request. The market creator network server sends a form for creating a new ad to the participant node computer with said participant node's network node identification code attached. The user fills in the form at procedure 108 with information including the token description to be uploaded to the market creator network database, an electronic mail address, a price, and additional textual description to remain stored in the participant node, and photographs and artwork to remain stored in the participant node. The participant node application software directly or indirectly, such as by calling another program, verifies that enough information has been filled out in the form and accepts the file. The owner or operator of the market creator network does a quality control verification of said file received from the participant node. Upon acceptance of said file, the market creator network server saves the token description listing information and network node identification code in its database and uses the information to create a computer file. The market creator network server then sends said file to the participant node computer via the persistent network connection at procedure 109 or notifies the participant node user to download the file. The participant node user receives the file at procedure 110 or receives the notification at procedure 111 and downloads the file to the participant node. The participant node application software places the file in a location that said software would make viewable by a user computer when the participant node is online at procedure 112. The process is complete at procedure 113 at which the persistent network connection is removed and procedure 114 where the participant node application software is terminated.

Advertisement changes take place when the participant node user selects a change at procedure 106. The participant node application software establishes a persistent network connection via the Internet to the market creator network server at procedure 107. The participant node user uses said software to send a request to the market creator network server for changing an advertisement with the network node identification code attached to the request. The market creator network server sends an advertisement change form to the participant node computer.

The participant node user makes changes in the form at procedure 108 with information including the token description to be uploaded to the market creator network database, an electronic mail address, a price, the participant node location, and additional textual description to remain stored in the participant node, and photographs and artwork to remain stored in the participant node. The participant node application software directly or indirectly, such as by calling another program, verifies that enough information has been filled out in the form and accepts the file. The owner or operator of the market creator network does a quality control verification of the file received from the participant node if the token description has been changed. Upon acceptance of said file, the market creator server saves the token description listing information and network node identification code in its database and uses the information to create a computer file. The market creator network server then sends the file to the participant node computer via the persistent network connection at procedure 109 or notifies the participant node user to download the file. The participant node user receives the file at procedure 110 or receives the notification at procedure 111 and downloads the file to the participant node. The participant node application software places the file in a location that said program would make viewable by a user computer when the participant node is online at procedure 112. The process is complete at procedure 113 at which the persistent network connection is removed and procedure 114 where the participant node application software is terminated.

FIG. 7 is a flow chart depicting an implementation of user access to the participant node. The user uses a browser to enter the market creator web site at procedure 300. At procedure 301 the user has accessed the market creator network server. The user can enter a keyword search at procedure 302. The market creator network searches its database for the keywords entered at procedure 303. The results, if any, are sent to the user at procedure 304. By a result is meant a token description placed in the market creator network by a participant node user found as a result of a search by said user. Procedure 306 shows there are no results if the search yields none. Procedure 311 allows the user to select another search or exit at procedure 312. If there are results, procedure 307 allows the user to select a result or change the search. Procedure 308 sends the network address of the participant node, such as an IP address in a TCP/IP network, to the user if a result is selected that is the token description placed in the market creator network by said participant node. The user receives said network address at procedure 309. Said user's computer is connected to the participant node with said network address and said user views the ad located at said participant node at procedure 310.

What is claimed is:

1. A system to create a market for items comprising goods, services, information, or any combination thereof, said system comprising,
   A) a plurality of participant nodes, each participant node comprising,
      1. a computer medium,
      2. a means for a user of the system to enter data into said computer medium;
      3. a means for said user of the system to store said data into said computer medium;
      4. a means for said user of the system to display said data entered or stored by said computer medium;
      5. a communication means for said computer medium to communicate with a market creator network and user computers;
      6. a participant node application software stored in said computer medium, said software comprising instructions that, when executed, cause:
         i. a means of said participant node to enable said computer medium to receive and store said data;
         ii. a means of said participant node to enable said computer medium to display said data entered or stored;
         iii. a means of said participant node to enable said computer medium to communicate with said market creator network;
         iv. a means of said participant node to enable said computer medium to create, display, and store in said participant node a full description of an item and furthermore; create, display, and store in said market creator network, a token description of said item, and
         v. a means of said participant node to enable said computer medium to receive and respond to requests from said user computers for said full description of said items;
         vi. said participant node to create said token description by downloading a form from said market creator network and filling in prescribed fields;
         vii. said participant node to upload said token description to said market creator network that presents said token description to users searching said market creator network for said items;
   B) a market creator network comprising,
      1. at least one server computer medium,
      2. at least one connection to a global communication network,
      3. a communication means to communicate with said participant nodes and user computers of said users searching said market creator network for said items;
      4. a means for said participant nodes to list said items;
      5. a means to store said token descriptions entered by participant node users;
      6. a means to search for said items stored in said market creator network;
      7. a means to provide access by said user computers, to said full descriptions of said items, said full descriptions of said items located in one or more said participant nodes;
      8. a means to dynamically create a link that is embedded in each token description returned to said user computer and said user computer is programmed to search for said items on said market creator network, wherein said link embedded in each token description indicates the current network address of the respective participant node;
      9. a means to provide said user computer with access to the full description of at least one of said searched items by disconnecting said user computer from said market creator network and connecting said user computer to the current network address of the respective participant node identified in the token of the selected at least one of said searched items, and
   C) a global communication network.

2. The system of claim 1 wherein said token description of said item comprises text description.

3. The system of claim 1 wherein said full description of said item comprises text description.

4. The system of claim 1 wherein said token description of said item further comprises a telephone number.

5. The system of claim 1 wherein said token description of said item further comprises an email address.

6. The system of claim 1 wherein said token description of said item further comprises a sale price.

7. The system of claim 1 wherein the participant node is further made able via said application software to change, delete, and edit information in said token description of said item residing in said market creator network.

8. The system of claim 1 wherein said full description of said item further comprises a title.

9. The system of claim 1 wherein said full description of said item further comprises digital images.

10. The system of claim 1 wherein said full description of said item further comprises scanned images.

11. The system of claim 1 wherein said full description of said item further comprises PDF files and/or video files.

12. The system of claim 1 wherein said full description of said item further comprises links to one or more web sites.

13. The system of claim 1 wherein said full description of said item further comprises one or more telephone numbers.

14. The system of claim 1 wherein said full description of said item further comprises one or more email addresses.

15. The system of claim 1 wherein said full description of said item further comprises the address of a physical location.

16. The system of claim 1 wherein said full description of said item further comprises one or more prices.

17. The system of claim 1 wherein said participant node is further made able via said application software to create said full description by downloading a form from said market creator network and filling in prescribed fields.

18. The system of claim 1 wherein said participant node is further made able via said application software to change, delete, and edit information in said full description of said item residing in said participant node.

19. The system of claim 1 wherein said means for a user of the system to enter data into said computer medium comprises a keyboard.

20. The system of claim 1 wherein said participant node further comprises a means to create digital image data files.

21. The system of claim 20 wherein said means to create digital image data files is a digital scanner.

22. The system of claim 20 wherein said means to create digital image data files is a digital camera.

23. The system of claim 20 wherein said means to create digital image data files is a digitizing tablet.

24. The system of claim 1 wherein said means to display said data comprises an LCD display.

25. The system of claim 1 wherein said means to store said data comprises a disk drive.

26. The system of claim 1 wherein said means to establish communication comprises a router connected to said global communication network.

27. The system of claim 1 wherein said global communication network comprises the Internet.

* * * * *